United States Patent [19]
Ciliberti et al.

[11] Patent Number: 4,553,986
[45] Date of Patent: Nov. 19, 1985

[54] FILTERING SYSTEM AND METHOD OF USING SAME

[75] Inventors: David F. Ciliberti, Murrysville Boro; Thomas E. Lippert, Murrysville, both of Pa.

[73] Assignee: Westinghouse Electric Corp., Pittsburgh, Pa.

[21] Appl. No.: 670,790

[22] Filed: Nov. 13, 1984

[51] Int. Cl.$^4$ .............................................. B01D 53/14
[52] U.S. Cl. ........................................... 55/68; 55/96; 55/302; 55/316; 55/341 R; 55/523
[58] Field of Search ............ 55/73, 74, 96, 179, 55/180, 316, 317, 302, 372, 379, 502, 504, 523, 68, 341 R, 341 HM; 423/242 A, 244 A

[56] References Cited
U.S. PATENT DOCUMENTS

| | | | |
|---|---|---|---|
| 1,176,721 | 3/1916 | Zimmer | 55/379 X |
| 2,735,508 | 2/1956 | Krieble | 55/316 |
| 3,501,897 | 3/1970 | Van Helden et al. | 55/73 |
| 4,088,736 | 5/1978 | Courty et al. | 423/244 A X |
| 4,154,581 | 5/1979 | Nack et al. | 423/244 A X |
| 4,273,750 | 6/1981 | Hollett et al. | 423/244 A |
| 4,398,931 | 8/1983 | Shevlin | 55/379 X |
| 4,486,201 | 12/1984 | Noguchi | 55/96 |

*Primary Examiner*—Charles Hart
*Attorney, Agent, or Firm*—Daniel C. Abeles

[57] ABSTRACT

A filter system wherein a hollow tubular member having an imperforate wall with a plurality of slots therein is coaxially positioned within a perforated mandrel that supports a ceramic bag filter. Gases to be filtered pass through the bag filter and deposit particulate matter thereon, enter a chamber between the perforated mandrel and the hollow tubular member, and are directed through the slots into the interior of, and are discharged from an open end of the hollow tubular member. Vapor phase contaminants in the gas can also be removed by providing a bed of solid absorbent material in the hollow tubular member such that the gas contacts the solid absorbent material and the vapor phase contaminant is removed prior to discharge of the gas from the open end of the hollow tubular member.

9 Claims, 3 Drawing Figures

FILTERING SYSTEM AND METHOD OF USING SAME

BACKGROUND OF THE INVENTION

Woven ceramic filter bags or tubes have been shown to be effective collectors of particulates in high temperature environments. Conventionally, filter systems using such bags comprise a plurality of the bags each of which are mounted on a perforated metal support mandrel that is inwardly suspended from a wall of an enclosure, such as an insulated pressure vessel. As a flow of gases containing particulates is charged to the enclosure, the flow must pass through the suspended filter bags and is discharged through the mandrels which have an open end facing the outside of the enclosure. During the passage of the flow through the filter bags, the particulates are removed and collected on the surface of the bag that is exposed to the enclosure.

A major feature of the woven ceramic bag is its ability to be cleaned (i.e., the collected dust cake is dislodged from the filter and collected in a dust collection hopper) by reverse pulse jet methods. In a reverse pulse jet cleaning, a short, high pressure jet of gas, such as air, is fed to the interior of the perforated mandrel, through its open end, and the jet of gas imparts an expanding outward motion to the bag which dislodges the accumulated dust cake from the surface. The type of system above described and the jet pulse cleaning of filters in such a system are known.

In some instances, the flow of gas which contains the particulate material also contains vapor phase contaminants that pass through the filters and must be subsequently removed from the gas. For example, the conversion of fossil fuels to either combustion products or fuel gas can result in the release of particulate and gas phase contaminants such as alkali and sulfur to the gas stream. Utilization of the high temperature fuel or combustion gases requires the removal of both the particulate and gas phase contaminants to protect downstream equipment from corrosion and deposits and to meet environmental discharge regulations. New concepts are currently being developed that can removed particulates from high temperature gases and for removing alkali and sulfur. Most approaches to date have envisioned separate hardware arrangements for effecting the removal of each contaminant. These approaches generally result in expensive duplication of some hardware and the possibility of uneconomical systems.

It is an object of the present invention to provide a filter system which results in improved cleaning of filter bags.

It is another object of the present invention to provide a filter system that has a close coupling between a particulate separator and a fixed-bed contactor for the removal of vapor phase contaminants in a gas.

SUMMARY OF THE INVENTION

An improved filter system that has a ceramic bag filter supported on a perforated mandrel, where the bag filter is disposed in a housing such that gases must be passed through the bag to deposit solids thereon and are then exhausted from the mandrel, provides for a hollow tubular member to be axially supported within the mandrel. The hollow tubular member has an impervious wall with a plurality of slots therein, and forms an annular chamber between the tubular member and the mandrel. The annular chamber is sealed at both ends, with a port in one of the seals through which a jet pulse of gas is charged so as to flex and clean the filter bag. Dirty gas flow is from the housing, through the filter bag and perforated mandrel, with solids deposited on the bag, into the annular chamber and is then directed through the slots of the tubular member into the interior of the tubular member and out an open end thereof.

In an embodiment where vapor phase contaminants in the gas are to be removed, along with particulate matter, a bed of absorbent material, or gettering agent, is provided within the tubular member such that gases which flow into the interior thereof must then pass through the absorbent bed and the vapor phase contaminants are removed prior to discharge of the gases from the open end of the tubular member.

DETAILED DESCRIPTION

The present improved filter system is especially useful in the removal of particulate material from a high temperature, high pressure gas stream with improved jet pulse cleaning of a ceramic bag filter provided. In another embodiment, the filter system is usable to remove vapor phase contaminants from a gas stream, as well as removing particulate matter, with the vapor phase contaminant removed prior to discharge of the gas stream from a mandrel supporting a ceramic bag filter.

Figure 1:
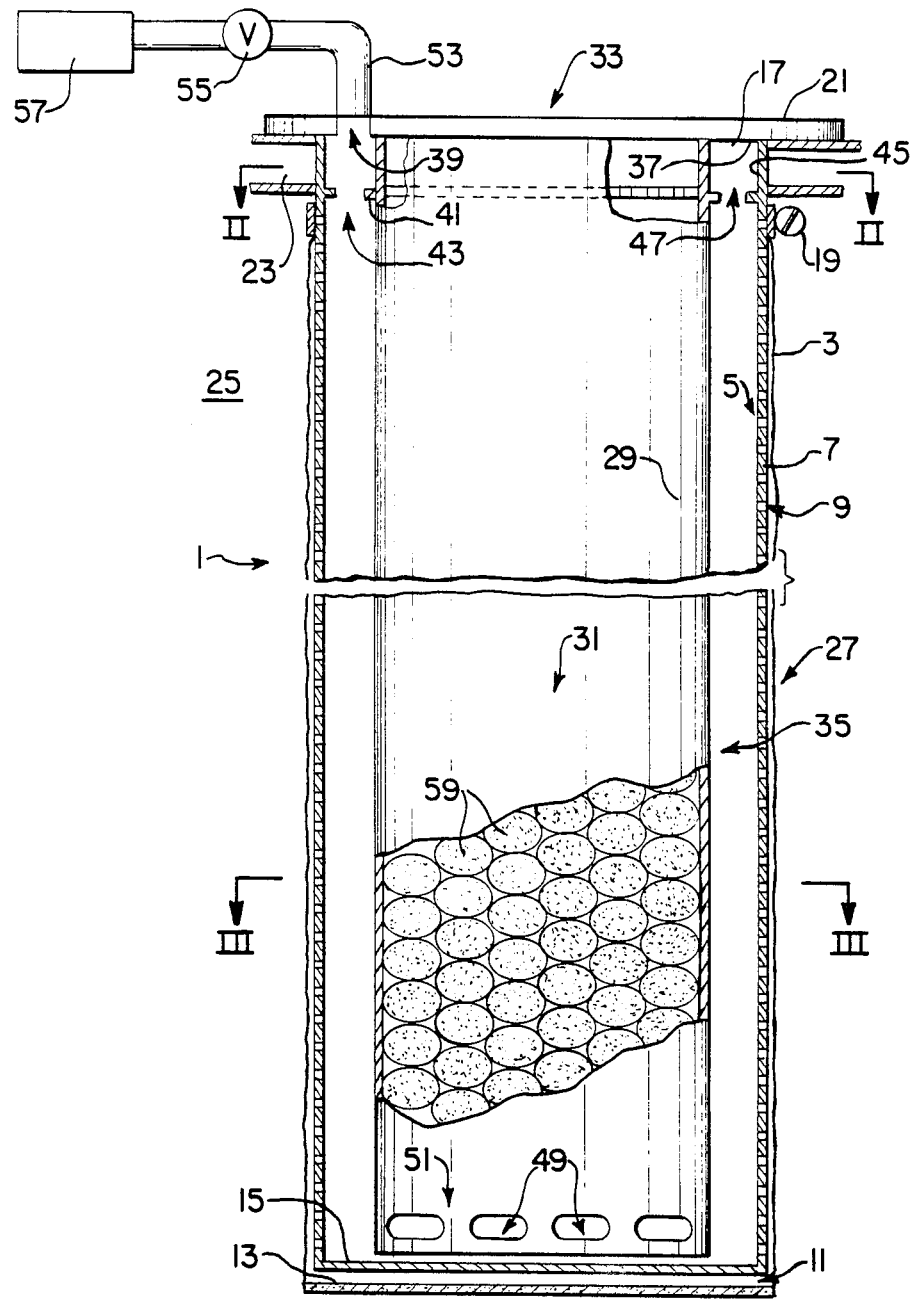
FIG. 1 is a cross-sectional view of an embodiment of the filter system of the present invention with the tubular member shown intact but with sections of the wall thereof broken away.

An embodiment of a filter system 1 of the present invention is illustrated in the drawings. Referring now to FIG. 1, there is shown a ceramic bag, or tubular, filter 3 supported about a hollow mandrel 5, the wall 7 of the mandrel 5 having perforations 9 therethrough. Generally, the bottom 11 of the bag filter 3 is closed with a ceramic disc 13, which disc aids in mantaining the bag in extended position. Or, the bag filter may be clamped to the end of the hollow mandrel 5. The mandrel 5 has a closed end 15 adjacent the bottom 11 of the bag filter 3. The bag filter 3 is normally affixed to the mandrel 5 adjacent the open top 17 thereof by a releasable clamp 19. At the top of the mandrel 5, a flange 21 is provided for securing the mandrel to a tube sheet or wall 23 of an enclosure 25 to which particulate-containing gases to be filtered are charged. In order to escape the enclosure, the gases must radially pass through the bag filter 3, through the perforations 9 of the wall 7 of mandrel 5, and out through the open top 17 thereof. Particulate material is deposited on the outer surface 27 of the bag filter 3. In order to remove particulate deposits from the bag filter 3, a jet of high pressure fluid is injected into the mandrel 5 to fragment and dislodge the particulate deposits. The aforedescribed filter arrangement and cleaning method are known in the art.

Figure 2:
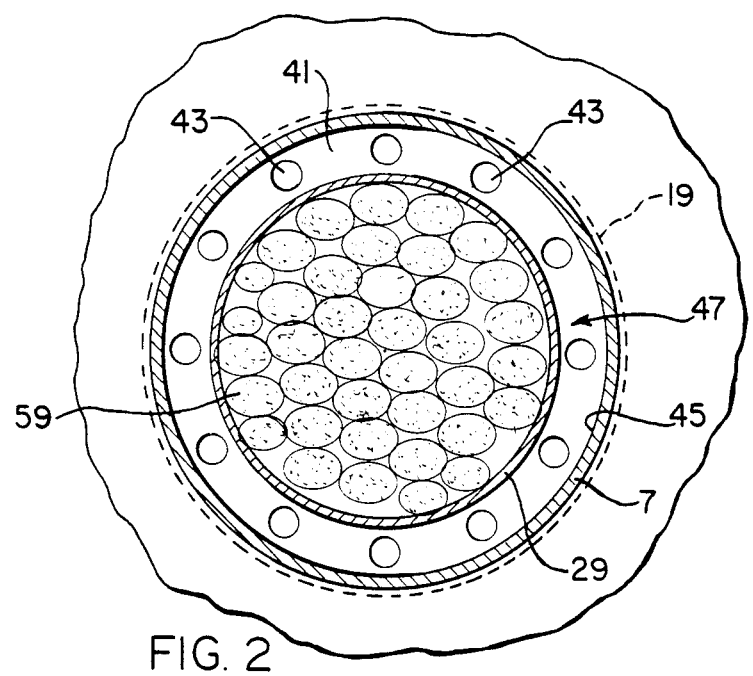
FIG. 2 is a view taken along lines II—II of FIG. 1.
Figure 3:
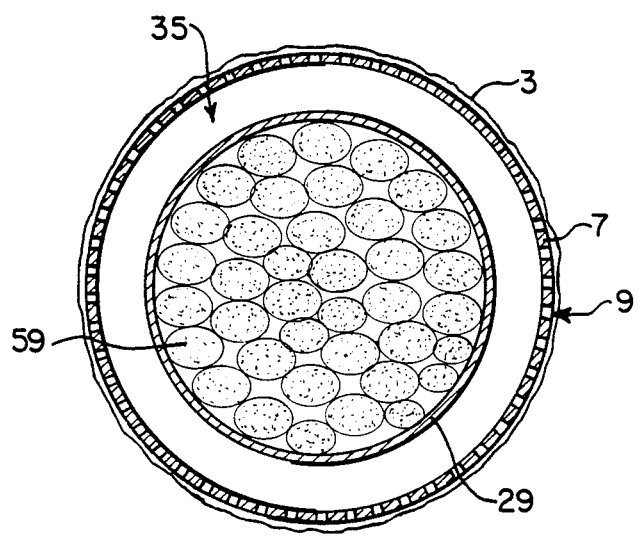
FIG. 3 is a view taken along lines III—III of FIG. 1.

In the present filter system, a hollow tubular member 29 is coaxially supported within the perforated mandrel 5, the tubular member 29 having impervious walls 31 within the mandrel, and an open end 33 adjacent the open end 17 of the mandrel 5. A chamber 35 is thus formed between the impervious wall 31 of the tubular member 29 and the perforated wall 7 of the mandrel 5. An annular seal 37 is formed by flange 21 and extends between the mandrel 5 and tubular member 29 in the region adjacent the open end 17 of the mandrel 5, to seal the chamber 35. The annular seal 37 has at least one port 39 therein. A distributor plate 41, having a plurality of spaced apertures 43 (FIG. 2), or an annular gap, is secured between the impervious wall 31 of the tubular member 29 spaced adjacent to the seal 37. The upper portion 45 of the wall 7 of the mandrel 5 between the annular seal 37 and the distributor plate 41 is devoid of perforations, or the perforations blocked so as to form an upper annular chamber portion 47. The tubular member 29 has a plurality of slots 49 therein, preferably at the lower region 51 thereof, which communicate between the interior of the tubular member 29 and chamber 35. A gas inlet tube 53 having a valve 55 thereon connects a source of pressurized gas 57 to the port 39 in seal 37.

During operation of the filter system 1, the gases, containing particulates, from enclosure 25 are radially passed through the bag filter 3 and apertures 9 of wall 7 of the perforated mandrel 9 into the chamber 35. Because of the seal 37, the gases, which are now clean, having deposited the particulates on the surface 27 of bag filter 3, are directed through slots 49 in the wall 31 of the tubular member 29 and flow upwardly through the interior of the tubular member 29 and exit therefrom through open end 33. As particulates are collected on the surface 27 of bag filter 3, the pressure drop between the enclosure and the chamber 35 increases and a level is reached where the accumulated particulates, or dust cake, must be removed. In accordance with the present invention, removal of the dusk cake is achieved by providing a pulse of gas through the inlet line 53 and through port 39 to the upper annular chamber portion 47. This pulse of gas is distributed through apertures 43 of distributor plate 41 into the annular chamber 45. This distributed pulse of gas causes an outward force to be directed, through the perforated mandrel 5, against the filter bag 3 causing radially outward movement on the bag to flex the bag and dislodge the dust cake from the surface 27.

The above-described system results in an improved cleaning of the filter bag because of the reduced internal volume within the filter bag support mandrel. The coaxial arrangement of the hollow tubular member 29 within the perforated mandrel 5 requires that only the annular chamber 35 be pressurized during jet pulse cleaning. For the same pulse-flow, this arrangement results in an increased rate of pressurization and a better distribution of the cake detachment force over the filter bag surface. This feature is additionally enhanced when the slots 49 in the hollow tubular member 29 are situated at the lower region 51 thereof. These slots, or flow control orifices, should be sized such that their resistance to flow is large compared to the resistance of the filter bag and dust cake. The hollow tubular member 29, with slots 49, prevents the short-circuiting of the pulse flow to the filter bag outlet; a situation that could occur in a conventional mandrel-supported filter bag arrangement.

The filter system, when using woven ceramic filter bags, is usable for gases at elevated temperatures, i.e. between about 500-1100° C., and at a range of pressures within the enclosure, from slightly below atmospheric pressure to a pressure up to about 211,000 Kg/m$^2$. Examples of such ceramic woven cloths are those woven from alumina-boria-silica ceramic, made by Minnesota Mining and Manufacturing Company, and Fibrasil cloth, made by Carborundum Resistant Materials Company. Such cloths are stable at temperatures in the 900°-1100° C. range.

In a further embodiment of the present invention, the filter system may be used to close-couple the removal of solids from a gas and the removal of vapor phase contaminants in the gas. This is a accomplished by providing a means for removing vapor phase contaminants within the interior of the tubular member 29. As illustrated in the drawings, the means for removing the vapor phase contaminants may comprise a bed of absorbent bodies 59, or plurality of discrete pellets, within the tubular member 29 which acts as a canister. After the particulate solids have been deposited on surface 27 of bag filter 3, the gases containing vapor phase contaminants which pass through the filter bag 3, pass to chamber 25 and are directed through slots 49 into the interior of the tubular member 29. The gases must then flow upwardly through the bed of absorbent bodies 59 and discharge through the open top 33. In passing through the bed of absorbent bodies 59, the vapor phase contaminant is preferentially absorbed into the absorbent bodies.

The present invention thus provides a close coupling between a fixed-bed absorbent supply and a particulate removal system, eliminating expensive interconnecting gas piping and the need for separate pressure vessels when used in treatment of high temperature, high pressure gas streams. Also, with the close coupling, the gas flowing directly from the filter to the fixed bed contactor prevents reintrainment of previously deposited dust and particle agglomerates normally found in long piping runs. Thus, the close coupling of the particulate removal filter and the fixed-bed contactor should significantly reduce the risk of plugging of the fixed-bed due to dust carryover. Temperature losses are also minimized.

Since a plurality of mandrel-supported bag filters are, as is known, generally ussed in a wall of a filter housing, when one of the bag filters fails, such as by being torn, gas flow from the housing will short-circuit through the damaged bag filter. In the present embodiment, with a solid absorbent supply in the hollow tubular member, particulate-containing gases that short-circuit through a damaged bag filter will flow through the supply of solid absorbent which acts in the nature of a filtering unit until plugged with particulate material which will, in effect, shut off flow through the damaged bag filter without removal of the unit, while the remaining units can continue to function to remove both particulate material and vapor phase contaminants from the gas stream. Thus, the present filter system provides a means of shutting off flawed or damaged bags in a system containing a plurality bag covered mandrels without interrupting normal filter operation. This ability has major advantages in applications where protection of downstream equipment is needed.

The particular material that will comprise the supply of absorbent material to be used in the hollow tubular member will depend upon the vapor phase contaminant to be removed from the gas. For example, in removal of vaporous alkali contaminants from a gas, the absorbent material could be activated bauxite, emanthlite, diatomaceous earth or the like. In removal of vaporous sulfur contaminants, the abosrbent material could be dolomite, limestone, iron oxide, zinc metal, or the like. The absorbent material would be one which is stable under the temperature and pressure conditions within the hollow tubular member but reactive with the vaporous contaminant so as to remove the same from the gas prior to discharge of the gas from the open end of the hollow tubular member.

The present filter system thus provides for more efficient cleaning of bag filters by pulse jet cleaning, and also provides for a close coupling of particulate removal and vapor phase contaminant removal in a gas flow.

What is claimed:

1. In a filter system having a ceramic bag filter supported about a hollow mandrel, said mandrel having perforations therethrough, such that a particulate-containing gaseous medium to be filtered is passed through the bag into the mandrel, at a flow rate above a predetermined minimum flow rate, to deposite particulate matter on the exterior of said bag, and filtered gas is discharged from an open end of the mandrel, the improvement comprising:
   a hollow tubular member coaxially supported within said mandrel, said tubualar member having impervious walls within the mandrel and an open end adjacent the open end of said mandrel to form a chamber thereabout between said tubular member and the perforated wall of the mandrel;
   means for sealing said chamber adjacent the open end of said mandrel comprising a flange extending between said tubular member and said mandrel,
   a port in said means for sealing said chamber, for injection of a jet pulse of fluid into said chamber;
   a distributor plate having a plurality of spaced apertures disposed across said chamber adjacent to and immediately below said means for sealing said chamber; and
   a plurality of slots in the impervious wall of said hollow tubular member equally spaced about said tubular member adjacent the end thereof opposite said open end such that filtered gas, after passage through the perforations of the mandrel are directed through said slots into the hollow tubular member and are discharged from the open end thereof, said tubular member being of a size and said slots being of a size arranged to provide a flow of gases through said mandrel at said flow rate.

2. In a filter system as described in claim 1, the improvement wherein said flange extends beyond said mandrel to provide a support for attachment to a wall of said enclosure.

3. In a filter system as defined in claim 1, the improvement wherein a bed of solid absorbent material is provided within said tubular member, said absorbent material sufficient to remove vapor phase contaminants within said gas from said gas prior to discharge of the gas from the open top thereof.

4. In a filter system as defined in claim 3, the improvement wherein said bed of absorbent material comprises a plurality of discrete pellets of absorbent material.

5. In a filter system as defined in claim 4, the improvement wherein said plurality of discrete pellets are formed from a material that will absorb alkali vapor phase contaminants in the gas.

6. In a filter system as defined in claim 4, the improvement wherein said plurality of discrete pellets are formed from a material that will absorb vaporous sulfur contaminants in the gas.

7. In a filter system having a ceramic bag filter supported about a hollow mandrel, said mandrel having perforations therethrough, such that a particulate-containing gaseous medium to be filtered is passed through the bag into the mandrel, at a flow rate above a predetermined minimum flow rate, to deposite particulate matter on the exterior of said bag, and filtered gas is discharge from an open end of the mandrel, the improvement wherein particulate matter and vapor phase contaminants are both removed from the gaseous medium, comprising:
   a hollow tubular member coaxially supported within said mandrel, said tubular member having impervious walls within the mandrel and an open end adjacent the open end of said mandrel to form a chamber thereabout between said tubular member and the preforated wall of the mandrel;
   a bed of solid absorbent material within said tubular member, said absorbent material sufficient to remove vapor phase contaminants from said gas;
   means for sealing said chamber adjacent the open end of said mandrel comprising a flange extending between said tubular member and said mandrel;
   a port in said means for sealing said chamber, for injection of a jet pulse of fluid into said chamber;
   a distributor plate having a plurality of spaced apertures disposed across said chamber adjacent to and immediately below said means for sealing said chamber; and
   a plurality of slots in the impervious wall of said hollow tubular member equally spaced about said tubular member adjacent the end thereof opposite said open end, such that filtered gas, after passage through the perforations of the mandrel with particulate matter removed therefrom, are directed through said slots into the hollow tubular member and contact said absorbent material with vapor phase contaminants removed therefrom, and clean gas from which particulate material and vapor phase contaminants have been removed is discharged from the open end of said hollow tubular member, said tubular member being of a size and said slots being of a size arranged to provide a flow of gases through said mandrel at said flow rate.

8. A method of removing particulate matter from a gas stream wherein:
   the gas stream containing said particulate matter is passed through a ceramic bag filter, supported by a perforated mandrel, having an open end, into the mandrel to deposit particulate material on the ceramic bag filter, with filtered gas entering the mandrel;
   a hollow tubular member having an imperforate wall with a plurality of slots therein equally spaced around the lower end thereof, is coaxially disposed within said mandrel, said tubular member having an open end adjacent the open end off said mandrel to form a chamber thereabout between said tubular member and the perforate mandrel;
   said filtered gas is directed from said chamber through said slots and into said hollow tubular member and through a solid absorbent material;
   said filtered gas in then discharged from the open end of said hollow tubular member; and
   particulate material collected on said ceramic bag is removed by injecting a jet pulse of gas about said chamber to provide substantially even flexing of said ceramic bag.

9. A method of removing particulate matter from a gas stream as defined in claim 8, wherein vapor phase contaminants are also removed from said gas stream by said solid absorbent material for said vapor phase contaminant in said hollow tubular member, and contacting said gas stream with said solid absorbent material to remove the vapor phase contaminant therefrom prior to discharge of the filtered gas from the open top of said hollow tubular member.

* * * * *